(12) United States Patent
Ding et al.

(10) Patent No.: US 11,836,067 B2
(45) Date of Patent: *Dec. 5, 2023

(54) HYPER-CONVERGED INFRASTRUCTURE (HCI) LOG SYSTEM

(71) Applicant: Dell Products L.P., Round Rock, TX (US)

(72) Inventors: Edward Ding, Shanghai (CN); Drake Yuan Qiu, Shanghai (CN); Lewei Ji, Shanghai (CN); Muzhar S. Khokhar, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 210 days.

This patent is subject to a terminal disclaimer.

(21) Appl. No.: 17/326,152

(22) Filed: May 20, 2021

(65) Prior Publication Data

US 2021/0271583 A1    Sep. 2, 2021

Related U.S. Application Data

(63) Continuation of application No. 16/179,499, filed on Nov. 2, 2018, now Pat. No. 11,023,354.

(51) Int. Cl.
*G06F 12/00* (2006.01)
*G06F 11/34* (2006.01)
(Continued)

(52) U.S. Cl.
CPC .......... *G06F 11/3476* (2013.01); *G06F 3/067* (2013.01); *G06F 3/0608* (2013.01);
(Continued)

(58) Field of Classification Search
CPC .. G06F 11/3476; G06F 11/14; G06F 11/2205; G06F 16/162; G06F 3/0608; G06F 3/0652; G06F 3/067
See application file for complete search history.

(56) References Cited

U.S. PATENT DOCUMENTS 9,747,057 B1 * 8/2017 Ramani ................... G06F 3/067
2016/0077745 A1 * 3/2016 Patel ..................... G06F 12/0253
714/704

(Continued)

OTHER PUBLICATIONS

Amos Kingatua, "Hypr-converged Infrastructure Guide," Apr. 8, 2018, 20 pages.

*Primary Examiner* — David Yi
*Assistant Examiner* — Tahilba O Puche
(74) *Attorney, Agent, or Firm* — Joseph Mencher

(57) ABSTRACT

A Hyper-Converged Infrastructure (HCI) system that includes a plurality of HCI log generating components and an HCI storage system that provides at least a portion of a log database. The HCI system receives a request from a management system to store a first log bundle of the plurality of HCI log generating components and determines the at least one second log bundle that is stored in the log database is at least a size threshold. The HCI system performs a log database clean operation on the at least one second log bundle and determines that the log database clean operation on the at least one second log bundle has provided an available storage capacity in the log database that is sufficient to store the first log bundle. The HCI system then stores the first log bundle in the log database.

20 Claims, 4 Drawing Sheets

(51) Int. Cl.
*G06F 3/06* (2006.01)
*G06F 16/16* (2019.01)
*G06F 16/172* (2019.01)

(52) U.S. Cl.
CPC .......... *G06F 3/0652* (2013.01); *G06F 16/162* (2019.01); *G06F 16/172* (2019.01)

(56) References Cited

U.S. PATENT DOCUMENTS

2017/0344311 A1* 11/2017 Oh ........................ G06F 3/0659
2020/0034459 A1* 1/2020 Rabe ..................... G06F 16/273
2020/0311132 A1* 10/2020 Demoor ................ G06F 16/901
2021/0271645 A1* 9/2021 Danilov .............. G06F 16/1752

* cited by examiner

HYPER-CONVERGED INFRASTRUCTURE (HCI) LOG SYSTEM

CROSS-REFERENCE TO RELATED APPLICATIONS

This application is a continuation of U.S. patent application Ser. No. 16/179,499, filed on Nov. 2, 2018, the disclosure of which is incorporated by reference herein in its entirety.

BACKGROUND

The present disclosure relates generally to information handling systems, and more particularly to log systems for information handling systems that provide a Hyper-Converged Infrastructure (HCI).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, are sometimes utilized to provide Hyper-Converged Infrastructure (HCI) systems. HCI systems provide a software-defined Information Technology (IT) infrastructure that virtualizes the elements of conventional hardware-defined systems, including virtualized computing (e.g., via a hypervisor), virtualized storage (e.g., via a software-defined Storage Area Network (SAN)), virtualized networking (e.g., via software-defined networking), and/or other HCI components known in the art. Log collection is an important feature in server devices that can be used by administrators to diagnose errors, identify inefficiencies, and/or provide other log uses that would be apparent to one of skill in the art. Conventional log collection systems for conventional server devices may operate to manage structured and unified log files. However, HCI clusters may be provided that include a plurality of HCI system systems that may be provided by server devices that are built from heterogeneous hardware and software components, and when such HCI systems are treated as a single system, log collections may be unstructured and may contain various log outputs from the heterogeneous hardware and software components. As such, traditional log collection from HCI systems in an HCI cluster may result in unrestricted incremental growth of the log files, which may use up the HCI system storage or dedicated log space, and/or may result in log files being deleted before they can be reviewed.

Accordingly, it would be desirable to provide an improved HCI log system.

SUMMARY

According to one embodiment, an Information Handling System (IHS) includes a storage system that provides at least a portion of a log database; a plurality of log generating components; a processing system coupled to the storage system and the plurality of log generating components; and a memory system that is coupled to the processing system and that includes instructions that, when executed by the processing system cause the processing system to provide a log management engine that is configured to: receive a request to store a first log bundle, wherein the first log bundle includes log files generated by each of the plurality of log generating components; determine whether at least one second log bundle that is stored in the log database is at least a size threshold; perform, in response to determining that the at least one second log bundle is at least the size threshold, a log database clean operation on the at least one second log bundle; determine whether the log database clean operation on the at least one second log bundle has provided an available storage capacity in the log database that is sufficient to store the first log bundle; and store, in response to determining that the log database clean operation on the at least one second log bundle has provided an available storage capacity in the log database that is sufficient to store the first log bundle, the first log bundle in the log database.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
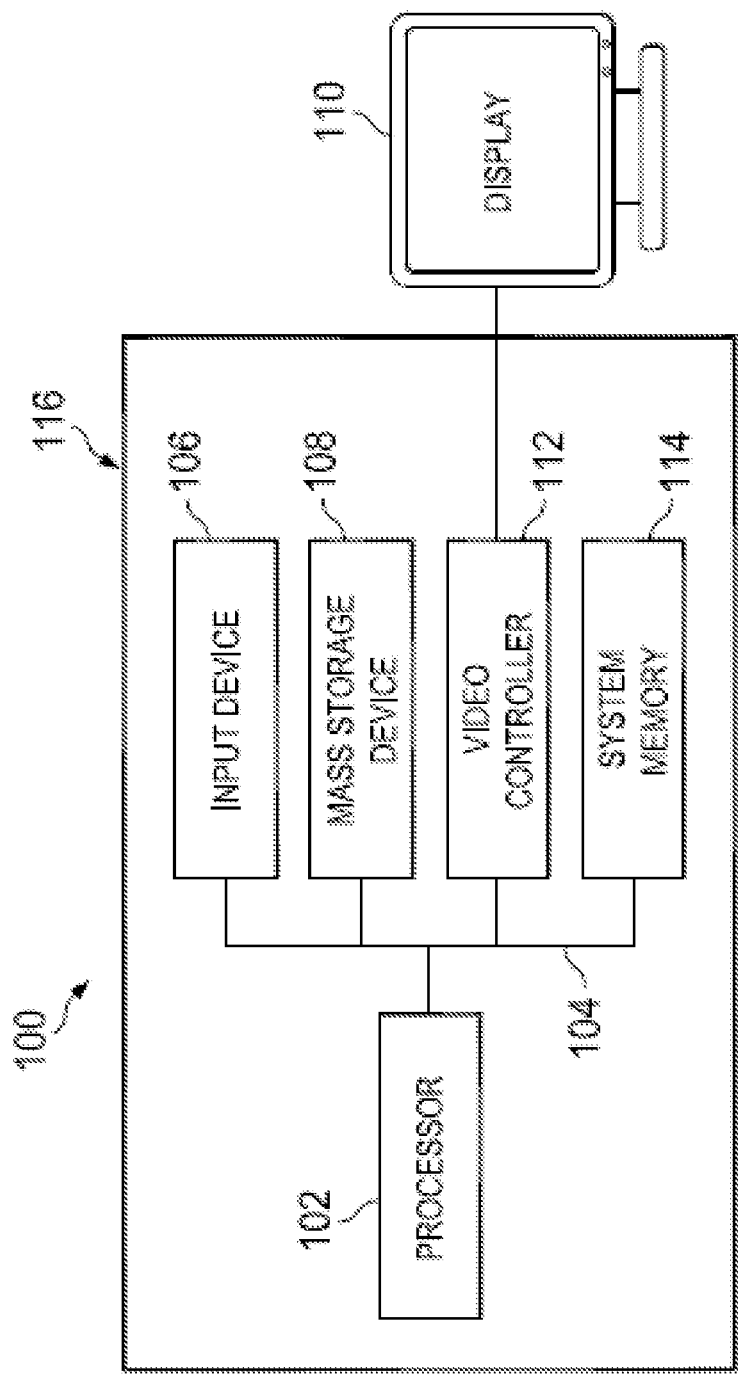
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
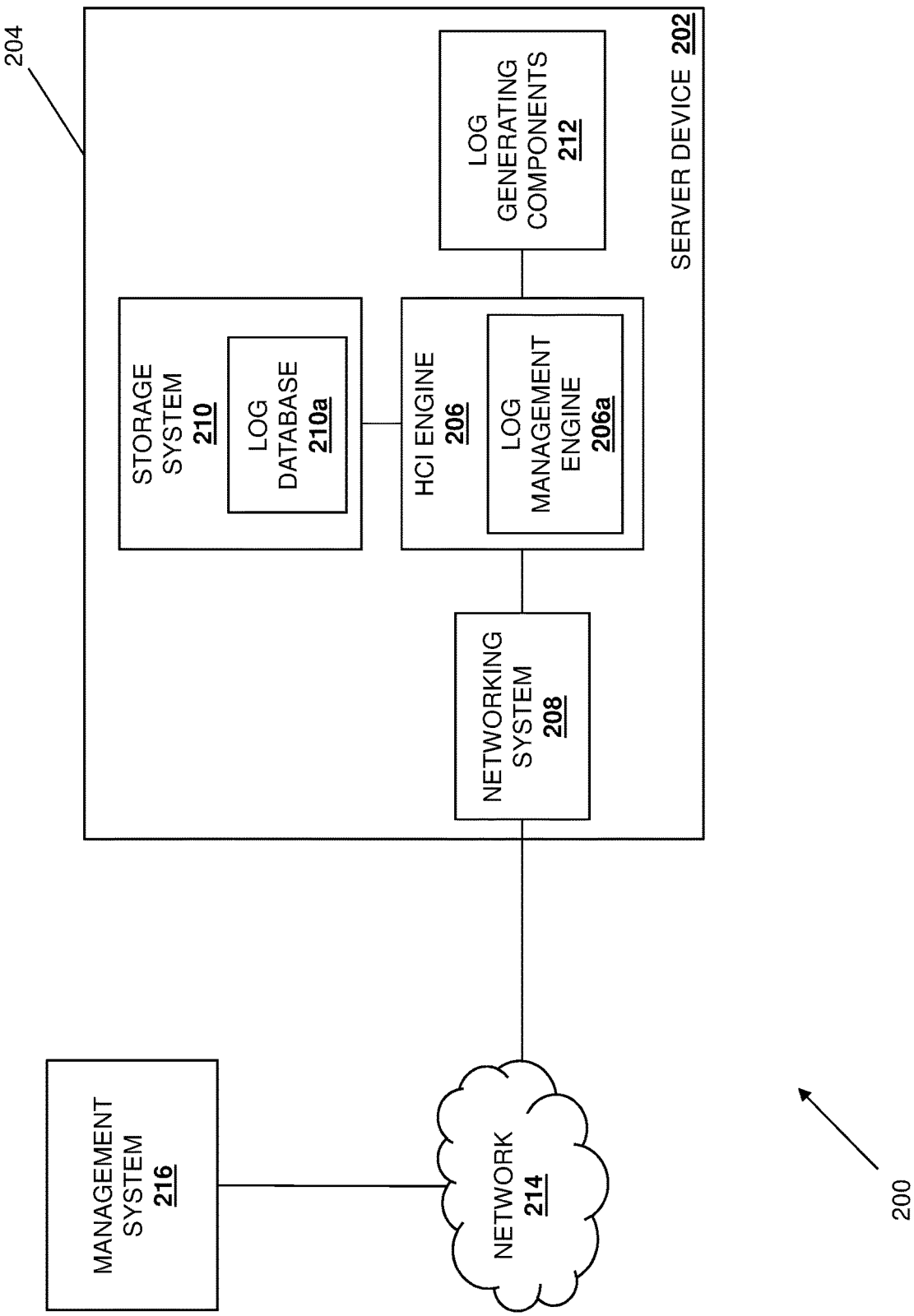
FIG. 2 is a schematic view illustrating an embodiment of a network including a Hyper-Converged Infrastructure (HCI) log system that operates according to the teachings of the present disclosure.

Referring now to FIG. 2, an embodiment of a network 200 is illustrated that operates according to the teachings of the present disclosure. In the illustrated embodiment, the network 200 includes a Hyper-Converged Infrastructure (HCI) system that is provided by a server device 202, and that may include an HCI log system according to the teachings of the present disclosure. In many embodiments, the server device 202 may be provided by the IHS 100 discussed above with reference to FIG. 1, and/or may include some or all of the components of the IHS 100. As discussed above, the server device of the present disclosure is utilized to provide an HCI system that includes a software-defined Information Technology (IT) infrastructure that virtualizes the elements of conventional hardware-defined systems, including virtualized computing (e.g., via a hypervisor), virtualized storage (e.g., via a software-defined Storage Area Network (SAN)), virtualized networking (e.g., via software-defined networking), and/or other HCI components known in the art. Furthermore, while not illustrated, multiple server devices (similar to the server device 202) may provide respective HCI systems (similar to the HCI system provided by the server device 202) that are each part of an HCI cluster. During operation of the HCI system provided by the server device 202, log files may be generated by each of the HCI components, and those log files may then be stored in a log database included in an HCI storage system. However, while illustrated and described as being provided by server devices, the HCI systems may be provided by a variety of computing devices while remaining within the scope of the present disclosure as well. Furthermore, while a single HCI system is illustrated and described in the examples below, as discussed above networks may include HCI clusters having multiple HCI systems provided by respective server devices, and networks may also include multiple HCI clusters while remaining within the scope of the present disclosure as well.

In the illustrated embodiment, the server device 202 includes a chassis 204 that houses the components of the server device 202, only some of which are illustrated in FIG. 2. For example, the chassis 204 may house a processing system (not illustrated, but which may include the processor 102 discussed above with reference to FIG. 1) and a memory system (not illustrated, but which may include the memory 114 discussed above with reference to FIG. 1) that is coupled to the processing system and that include instructions that, when executed by the processing system, cause the processing system to provide an HCI engine 206 that is configured to perform the functions of the HCI engines and server devices discussed below. In various embodiments, the HCI engine 206 may include a log management engine 206a that is configured to perform the functions of the log management engines and server devices discussed below. The chassis 204 may also house a networking system 208 that is coupled to the HCI engine 206 (e.g., via a coupling between the networking system 208 and the processing system) and that may include a Network Interface Controller (NIC), a wireless communication system (e.g., a BLUETOOTH® communication system, a Near Field Communication (NFC) system, a WiFi communication system, etc.), and/or other communication components that would be apparent to one of skill in the art in possession of the present disclosure.

The chassis 204 may also house a storage system 210 that is coupled to the HCI engine 206 (e.g., via a coupling between the storage system 210 and the processing system) and that may include direct-attached storage device(s) such as Hard Disk Drive(s) (HDD(s)), a Solid State Drive(s) (SSD(s)), and/or other direct-attached storage devices that would be apparent to one of skill in the art in possession of the present disclosure. In various embodiments, the networking system 208 and the storage system 210 may be configured to generate log files that may be grouped, by the log management engine 206a, as log bundles that may be stored in a log database 210a provided by the storage system 210, as discussed in further detail below. The chassis 204 may also house other log generating components 212 (e.g., besides the networking system 208 and the storage system 210) that are also configured to generate log files that may be grouped into log bundles by the log management engine 206a and stored in the log database 210a provided by the storage system 210 as well. For example, a chassis 202 may house a remote access controller (e.g., an integrated DELL® Remote Access Controller (iDRAC) available from DELL® Inc. of Round Rock, Tex., United States, a Baseboard Management Controller (BMC), and/or other components with similar functionality while remaining within the scope of the present disclosure as well), an operating system, Virtualization software stack, virtualization host operating system, a hardware operating service, and/or other log generating hardware or software components that would be apparent to one of skill in the art in possession of the present disclosure.

In a particular example, the HCI engine 206 may also be configured to virtualize the elements of conventional hardware-defined systems as discussed above, including virtualized computing (e.g., via a hypervisor using the processing system/memory system), virtualized storage (e.g., via a software-defined Storage Area Network (SAN) using the storage system 210), virtualized networking (e.g., via software-defined networking using the networking system 208), and/or other HCI components known in the art. While a specific server device 202 has been illustrated and described, one of skill in the art in possession of the present disclosure will recognize that server devices may include a variety of components other than those illustrated in order to provide conventional server device functionality, as well as the functionality discussed below, while remaining within the scope of the present disclosure.

In the illustrated embodiment, the server device 202 is coupled via the networking system 208 to a network 214 that may be provided by a Local Area Network (LAN), the Internet, and/or a variety of other networks that would be apparent to one of skill in the art in possession of the present disclosure. Furthermore, a management system 216 may be coupled to the network 214 as well, and may be provided by a server device, a client device, and/or other components that are configured to manage and gather log data generated by components of a server device 202 as described below. In many embodiments, the server device, the client device, and/or any of the other components that provide the management system 216 may be provided by the IHS 100 discussed above with reference to FIG. 1, and/or may include some or all of the components of the IHS 100. While a specific network 200 implementing the HCl log system of the present disclosure has been illustrated and described, one of skill in the art in possession of the present disclosure will recognize that HCl log systems provided according to the teachings of the present disclosure may include a variety of different components and/or component configurations while remaining within the scope of the present disclosure as well.

Figure 3:
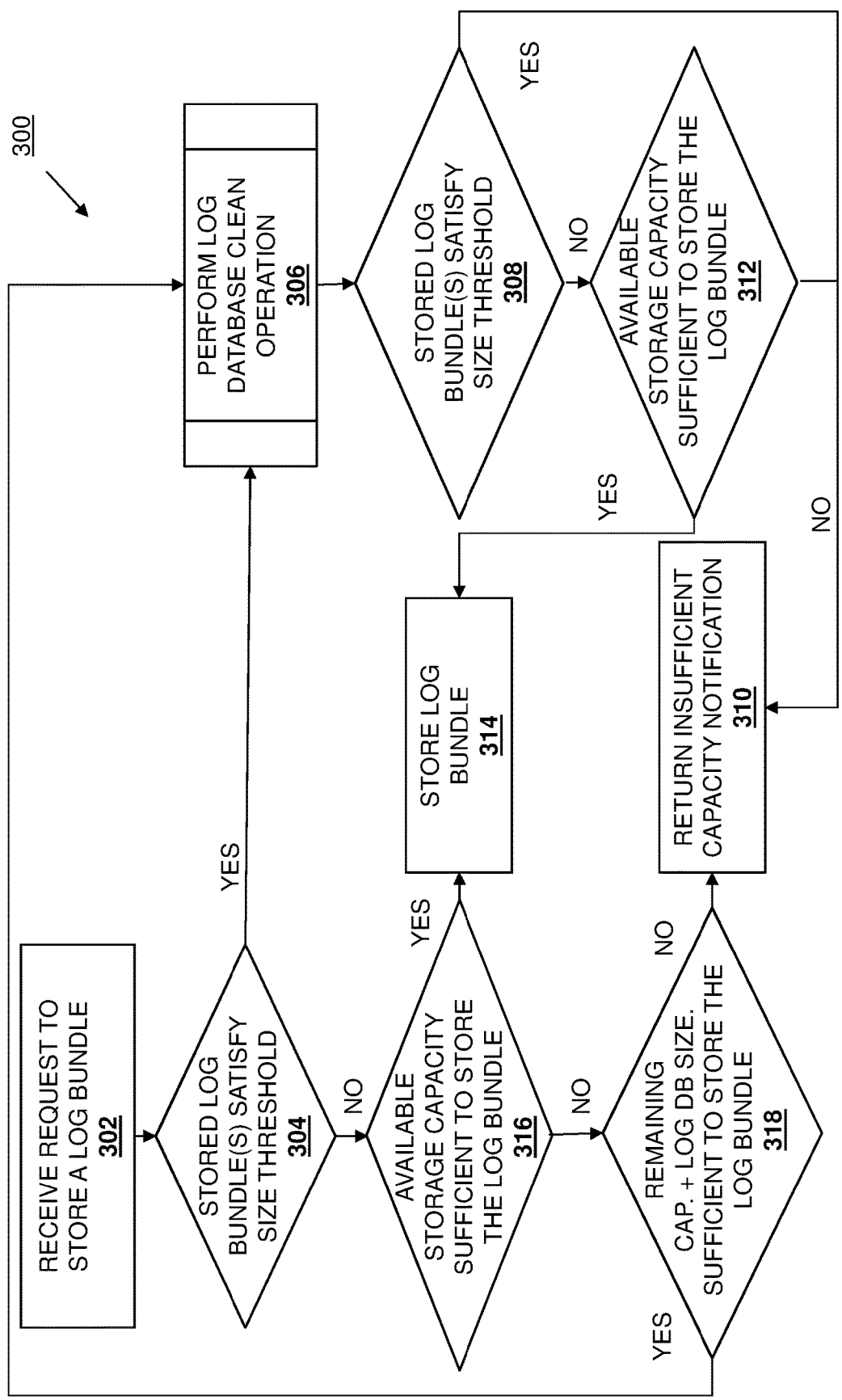
FIG. 3 is a flow chart illustrating an embodiment of a method for storing log bundles in an HCI system.

Referring now to FIG. 3, an embodiment of a method 300 for storing log bundles in HCl systems is illustrated. As discussed below, the systems and methods of the present disclosure prevent unrestricted incremental growth of log files, and maintain historical log data, for HCl systems that produce unstructured logs from the operation of the heterogenous hardware and software that are used to provide those HCl systems. This is achieved, at least in part, by providing for the log database capacity checks and log database clean operations described below. For example, the log database capacity checks determine whether at least one log bundle that is stored in the log storage system is above a size threshold when a request from a management system to store a first log bundle is received. In response to determining that the at least one log bundle is above the size threshold, a log database clean operation on the at least one log bundle is performed in an attempt to free up space in the log database. In response to determining that the log database clean operation on the at least one second log bundle has provided an available storage capacity in the log database that is sufficient to store the first log bundle, the first log bundle is stored in the log database. As such, historical log bundles and/or other log files of importance may be stored in the log database while limiting the amount of storage space that is dedicated to log bundles.

The method 300 begins at block 302 where a request to store a first log bundle is received. In an embodiment of block 302, the management system 216 may issue a request to store a first log bundle. For example, the management system 216 may provide the request over the network 214, and the request may be received by the log management engine 206a. The log management engine 206a may be configured to group log files generated by each of the HCl log generating components in the server device 202 such as, for example, the networking system 208, the storage system 210, and/or any of the log generating components 212 included in the server device 202. Each log file may include log data of events occurring in a respective log generating component. In a particular example, the log data included in a log file of a hardware operating service may include a hardware operating service log, a system log, an update log, a transaction log, a debug log, a virtual machine kernel log, and/or any other log file that may be apparent to one of skill in the art in possession of the present disclosure. The log management engine 206a may then group the log files into the first log bundle in response to receiving the request from the management system 216. However, one of skill in the art in possession of the present disclosure would recognize that the log management engine 206b may group the log files into the first log bundle in response to other events that are detected by the log management engine 206a while remaining within the scope of the present disclosure as well.

The method 300 then proceeds to decision block 304 where it is determined whether at least one second log bundle that is stored in a log database is at least a size threshold. In an embodiment of decision block 304, the log management engine 206a may determine whether at least one second bundle that is stored in the log database 210a of the storage system 210 is at least a size threshold. For example, the log management engine 206b may make the determination of whether the at least one second bundle is at least the size threshold in response to receiving the request to store the first log bundle, and before grouping the log files of the log generating components 208, 210, and/or 212 into the first log bundle. In some embodiments, the size threshold may be a predefined size threshold set by an administrator. In a particular example, the size threshold may be calculated based on a predetermined size coefficient that is multiplied by a full capacity of the log database 210a. As such, the predetermined size coefficient may be used to control the size of the log database 210a.

If, at decision block 304, it is determined that the at least one second log bundle that is stored in the log database is at least the size threshold, the method 300 then proceeds to block 306 where a log database clean operation is performed on the at least one second log bundle. In an embodiment of block 306, the log management engine 206a may perform a log database clean operation on the log database 210a. For example, the log database clean operation may be performed by the log management engine 206a to attempt to remove at least a portion of the log files included in the at least one second log bundle that is stored in the log database 210a such that there is sufficient storage space in the log database 210a to store the first log bundle.

Figure 4:
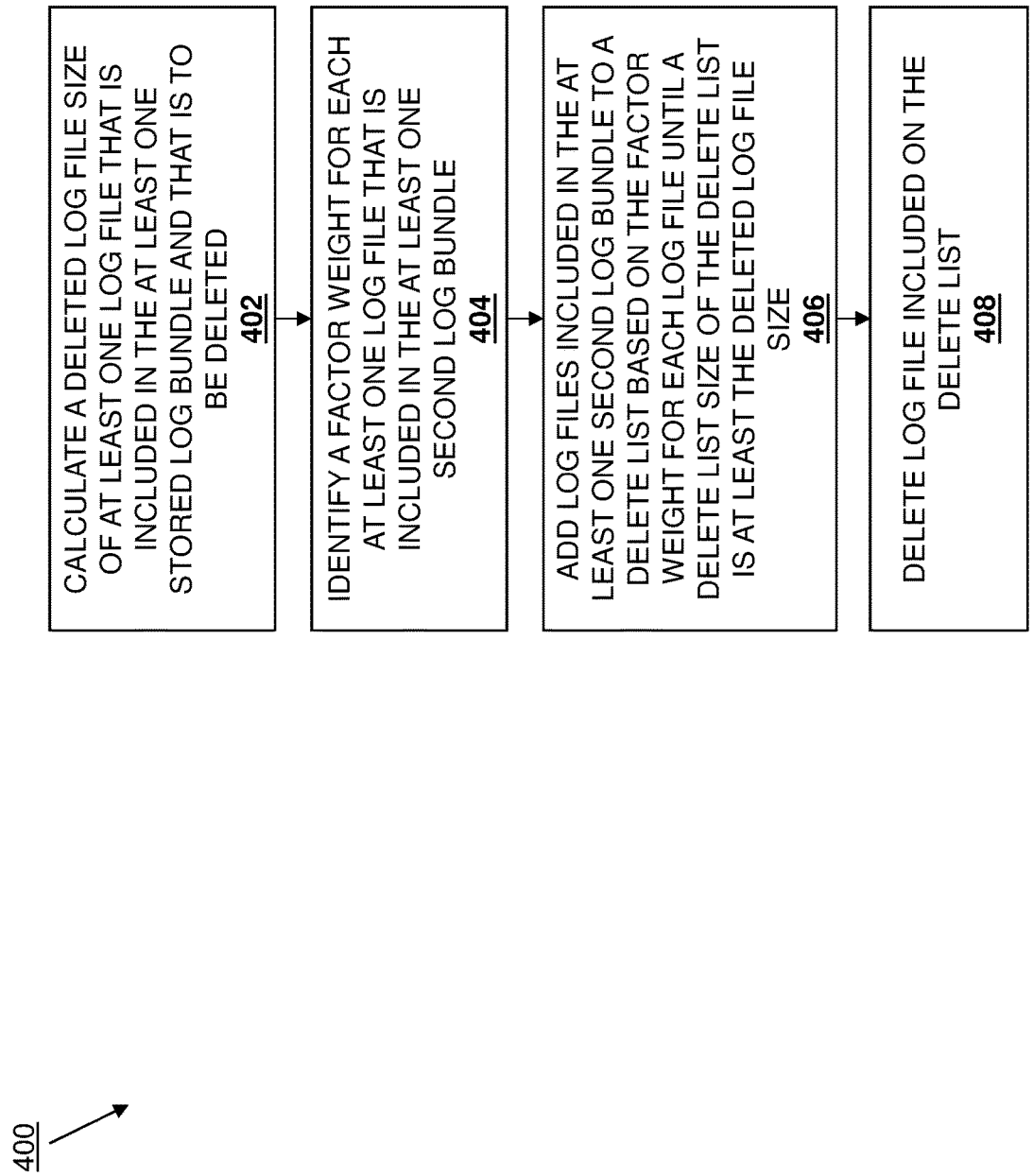
FIG. 4 is a flow chart illustrating an embodiment of a method for cleaning a log database an HCI system.

In a particular example, and with reference to FIG. 4, a method 400 for performing a log database clean operation in an HCl system (e.g., at block 306 of the method 300) is illustrated. The method 400 begins at block 402 where a deleted log file size of at least one log file, which is included in the at least one second log bundle and which is to be deleted, is calculated. In an embodiment of block 402, the log management engine 206a may calculate the deleted log file size of the at least one log file that is included in the at least one second log bundle in the log database 210a, and that is to be deleted from the log database 210a. In a specific example, the log management engine 206a may determine the deleted log file size to be the larger of (1) an available storage capacity of the log database that is sufficient to store the first log bundle, and (2) the difference of a log database size of the at least one second log bundle and the size threshold.

The method 400 may then proceed to block 404 where a factor weight for each at least one log file, which is included in the at least one second log bundle, is identified. In an embodiment of block 404, the log management engine 206a may identify the factor weight of each at least one log file that is included in the at least one second log bundle stored in the log database 210a. For example, the factor weight may be used to determine which log files included in the at least one second log bundle may be deleted to satisfy the deleted log file size.

The factor weight may be based on at least one of a log component priority, a log generated time tag, a log size, a container running status, and/or any other log file conditions that would be apparent to one of skill in the art in possession of the present disclosure. The log component priority may influence the factor weight based on an HCI component's potential for failure and/or HCI component's potential for disrupting the HCI system if that HCI component were to fail (e.g., log files for HCI components that are critical and/or that have a higher potential of failure may be stored longer). The log generated time tag may influence the factor weight based on when a log file is generated (e.g., older log files may be deleted before newer log files). Sizes of log files may also influence the factor weight (e.g., log files that are larger may be deleted before smaller log files). Container running status may contribute to the factor weight (e.g., log files associated with containers that have high container I/O or network payload are given higher priority). In various embodiments each log file condition may disproportionately affect the factor weight. For example, the log component priority may influence the factor weight more than the container running status, the log generated time tag, and the log size. While specific examples of calculating factor weight of a log file are discussed, one of skill in the art in possession of the present disclosure will recognize that log conditions that affect the factor weight, and how each of those log conditions affect the factor weight, may vary while remaining within the scope of the present disclosure.

The method 400 then proceeds to block 406 where log files included in the at least one second log bundle are added to a delete list, based on the factor weight for each log file, until a delete list size of the delete list is at least the deleted log file size. In an embodiment of block 406, the log management engine 206a may add the log files included in the at least one second log bundle to a delete list based on the factor weight for each log file until a delete list size of the delete list is at least the deleted log file size. In various embodiments, the log files that have higher factor weights may be added to the delete list over the log files with the lower factor weights. However, one of skill in the art would recognize that the factor weight may be calculated such that the log files with the lower factor weights may be added to the delete list over the log files with the higher factor weights. The log management engine 206a may add, to the delete list, the log file size of each of the log files as each log file is identified for the delete list, and compare the delete list size of the delete list to the deleted log file size to determine whether the delete list size of the delete list is at least the deleted log file size.

The method 400 then proceeds to block 408 where the log files included on the delete list are deleted. In an embodiment of block 408, log management engine 206a may delete the log files on the delete list when the delete list size of the delete list is at least the deleted log file size. In various embodiments of block 408, the log management engine 206a may delete the log files as the log files are added to the delete list until the delete list size of the delete list is at least the deleted log file size.

Referring back to FIG. 3, following the performance of the log database clean operations at block 306, the method 300 may then proceed to decision block 308 where it is determined whether the log database clean operation on the at least one second log bundle has resulted in the at least one second log bundle being at least the size threshold. In an embodiment of decision block 308, the log management engine 206a may determine, similarly as discussed above with respect to decision block 304, whether the log database clean operation on the at least one second log bundle has resulted in the at least one second log bundle being at least the size threshold. If the log database clean operation on the at least one second log bundle has resulted in the at least one second log bundle being at least the size threshold, then the method 300 then proceeds to block 310 where an insufficient capacity notification is provided. For example, the log management engine 206a may provide an insufficient capacity notification through the network 214 to the management system 216, and that insufficient capacity notification may then be displayed to an administrator of the management system 216 via a graphical user interface provided on a display device that is coupled to the management system 216. The insufficient capacity notification may indicate that the server device 202 needs additional storage in the storage system 210, or that the predetermined values used during method 300 may need to be adjusted.

If, at decision block 308, it is determined that the log database clean operation on the at least one second log bundle has resulted in the at least one second log bundle being below the size threshold, the method 300 then proceeds to decision block 312 where it is determined whether the log database clean operation on the at least one second log bundle has provided an available storage capacity in the log database that is sufficient to store the first log bundle. In an embodiment of decision block 312, the log management engine 206a may determine that an available storage capacity in the log database 210a is sufficient to store the first log bundle. For example, the available storage capacity in the log database 210a may need to be at least the size of the first log bundle. In some examples, the size of the first log bundle may be estimated based on historical data such as, for example, the size of any of the at least one second log bundles. In a specific example, the size of the first log bundle may be a predetermined factor multiplied by the estimated first log bundle size to ensure enough storage capacity is available for the first log bundle. For example, the size of the first log bundle may be the estimated first log bundle size multiplied by 1.1, 1.2, 2, 3, 4, and/or any other factor that would be apparent to one of skill in the art in possession of the present disclosure. In a specific example, the size of the first log bundle size may be the estimated first log bundle size multiplied by 2 as each log file may be stored and then grouped and compressed together as the first log bundle. As such there may be two instances of the log file data until the log files are deleted after the first bundle is created. If, at decision block 312, it is determined the log database clean operation on the at least one second log bundle has provided an available storage capacity in the log database that is insufficient to store the first log bundle, the method 300 then proceeds to block 310 where an insufficient capacity notification is returned as discussed above and the method 300 may end.

If, at decision block 312, it is determined the log database clean operation on the at least one second log bundle has provided an available storage capacity in the log database that is sufficient to store the first log bundle, the method 300 then proceeds to block 314 where the first log bundle is stored in the log database. In an embodiment of block 314, the log management engine 206a may group the log files from the various HCI log generating components (e.g., the networking system 208, the storage system 210, and the log generating components 212) into the first log bundle and store the first log bundle in the log database 210a and the method 300 may end.

Returning to decision block 304, if at decision block 304 the at least one second log bundle that is stored in the log database is below the size threshold, the method 300 then proceeds to decision block 316 where it is determined whether the available storage capacity in the log database is sufficient to store the first log bundle. In an embodiment of decision block 316, the log management engine 206a may determine that an available storage capacity in the log database 210a is sufficient to store the first log bundle in a manner that is similar to that described above for decision block 312. For example, the available storage capacity in the log database 210a may need to be at least the size of the first log bundle. In some examples, the size of the first log bundle may be estimated based on historical data such as, for example, the size of any of the at least one second log bundles. In a specific example, the size of the first log bundle may be a predetermined factor multiplied by the estimated first log bundle size to ensure enough storage capacity is available for the first log bundle. For example, the size of the first log bundle may be the estimated first log bundle size multiplied by 1.1, 1.2, 2, 3, 4, and/or any other factor that would be apparent to one of skill in the art in possession of the present disclosure. If, at decision block 316, it is determined that the available storage capacity in the log database 210a is sufficient to store the first log bundle, the method 300 then proceeds to block 314 where the first log bundle is stored in the log database and the method 300 ends.

However, if at decision block 316 it is determined the available storage capacity in the log database is insufficient to store the first log bundle, the method 300 then proceeds to block 318 where it is determined whether the storage system supports the first log bundle. In an embodiment of block 318, the log management engine 206a may determine whether the storage system 210 can support the first log bundle. For example, the log management engine 206a may calculate the available size of the storage system 210, which may include the unused storage space in the storage system 210. The log management engine 206a may then also calculate a reserved capacity, which may include the capacity of the storage system 210 that is allocated for use by the server device 202. The log management engine 206a may then determine the remaining capacity of the storage system 210, which may include the available size of the storage system 210 minus the reserved capacity. The log management engine 206a may then add the remaining capacity of the storage system 210 to the log database size of the at least one second log bundle, and if the sum of the remaining capacity of the storage system 210 and the log database size is sufficient to store the first log bundle, the method 300 then proceeds to block 306 where the log database clean operation is performed on the at least one second log bundle, similarly as discussed above. However, if the sum of the remaining capacity of the storage system 210 and the log database size is insufficient to store the first log bundle, the method 300 then proceeds to block 310 where the insufficient capacity notification is provided and the method 300 may end.

Thus, systems and methods have been described that provide for the storing of log bundles generated by HCl systems provided by heterogeneous server devices and/or other hardware and software. By performing a log database capacity check and a log database clean operation, unstructured log files from the heterogenous hardware and software components providing the HCl system may be bundled and stored in a log database without some of the issues associated with performing convention log retrieval operations on HCl systems. The log database capacity check determines whether there is available capacity before storing a log bundle and if not, determines whether a log database may support the storage of the log bundle. If there is not enough available capacity in the log database but the log database can support the storage of the log bundle, the systems and methods of the present disclosure will provide a log database clean operation to remove enough log files included in stored log bundles so that that log bundle may be stored in the log database. As such, the systems and methods of the present disclosure prevent unrestricted incremental growth of log files and maintain historical log data for HCl systems that produce unstructured logs from heterogenous hardware and software components.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A log system, comprising:
a management system; and
a computing system that includes:
  a plurality of log generating components; and
  a storage system that provides at least a portion of a log database, wherein the computing system is configured to:
    receive a request from the management system to store first log information generated by each of the plurality of the log generating components;
    determine that second log information that is stored in the log database is at least a size threshold;
    perform, in response to determining that the second log information that is stored in the log database is at least the size threshold, a log database clean operation on the second log information that includes:
      adding a subset of a plurality of second log files that are included in the second log information to a delete list based on respective factor weight for the subset of the plurality of second log files until a delete list size of the delete list is at least a deleted log file size that is the larger of (1) an available storage capacity in the log database that is sufficient to store the first log information, and (2) a difference of a log file size of the second log information and the size threshold; and
      deleting the subset of the plurality of second log files that were added to the delete list to provide an available storage capacity in the log database is sufficient to store the first log information; and
    store, in response to the log database clean operation on the second log information providing the available storage capacity in the log database that is sufficient to store the first log information, the first log information in the log database.

2. The system of claim 1, wherein the respective factor weights of the subset of the plurality of second log files are based on at least one of a log component priority, a log generated time tag, a log size, and a container running status.

3. The system of claim 1, wherein the performing the log database clean operation on the second log information includes:
calculating the deleted log file size of the subset of the plurality of second log files.

4. The system of claim 1, wherein the size threshold is calculated based on a predetermined size coefficient that is multiplied by a full capacity of the log database.

5. The system of claim 1, wherein the performing the log database clean operation on the second log information includes:
identifying the respective factor weight for each of the subset of the plurality of second log files.

6. The system of claim 1, wherein the plurality of log generating components are heterogenous hardware and software components.

7. The system of claim 1, wherein the computing system is a Hyper-Converged Infrastructure (HCl) system.

8. An Information Handling System (IHS), comprising:
a processing system; and
a memory system that is coupled to the processing system and that includes instructions that, when executed by the processing system cause the processing system to provide a log management engine that is configured to:
receive a request to store first log information generated by each of a plurality of the log generating components;
determine that second log information that is stored in a log database is at least a size threshold;
perform, in response to determining that the second log information that is stored in the log database is at least the size threshold, a log database clean operation on the second log information that includes:
adding a subset of a plurality of second log files that are included in the second log information to a delete list based on respective factor weight for the subset of the plurality of second log files until a delete list size of the delete list is at least a deleted log file size that is the larger of (1) an available storage capacity in the log database that is sufficient to store the first log information, and (2) a difference of a log file size of the second log information and the size threshold; and
deleting the subset of the plurality of second log files that were added to the delete list to provide an available storage capacity in the log database is sufficient to store the first log information; and
store, in response to the log database clean operation on the second log information providing the available storage capacity in the log database that is sufficient to store the first log information, the first log information in the log database.

9. The IHS of claim 8, wherein the respective factor weights of the subset of the plurality of second log files are based on at least one of a log component priority, a log generated time tag, a log size, and a container running status.

10. The IHS of claim 8, wherein the performing the log database clean operation on the second log information includes:
calculating the deleted log file size of the subset of the plurality of second log files.

11. The IHS of claim 8, wherein the size threshold is calculated based on a predetermined size coefficient that is multiplied by a full capacity of the log database.

12. The IHS of claim 8, wherein the performing the log database clean operation on the second log information includes:
identifying the respective factor weight for each of the subset of the plurality of second log files.

13. The IHS of claim 8, wherein the plurality of log generating components are heterogenous hardware and software components.

14. A method for storing log files in a Hyper-Converged Infrastructure (HCl) system, comprising:
receiving, by a computing system, a request to store first log information generated by each of a plurality of the log generating components;
determining, by the computing system, that second log information that is stored in a log database is at least a size threshold;
performing, by the computing system in response to determining that the second log information that is stored in the log database is at least the size threshold, a log database clean operation on the second log information that includes:
adding, by the computing system, a subset of a plurality of second log files that are included in the second log information to a delete list based on respective factor weight for the subset of the plurality of second log files until a delete list size of the delete list is at least a deleted log file size that is the larger of (1) an available storage capacity in the log database that is sufficient to store the first log information, and (2) a difference of a log file size of the second log information and the size threshold; and
deleting by the computing system, the subset of the plurality of second log files that were added to the delete list to provide an available storage capacity in the log database is sufficient to store the first log information; and
storing, by the computing system in response to the log database clean operation on the second log information providing the available storage capacity in the log database that is sufficient to store the first log information, the first log information in the log database.

15. The method of claim 14, wherein the respective factor weights of the subset of the plurality of second log files are based on at least one of a log component priority, a log generated time tag, a log size, and a container running status.

16. The method of claim 14, wherein the performing the log database clean operation on the second log information includes:
calculating, by the computing system, the deleted log file size of the subset of the plurality of second log files.

17. The method of claim 14, wherein the size threshold is calculated based on a predetermined size coefficient that is multiplied by a full capacity of the log database.

18. The method of claim 14, wherein the performing the log database clean operation on the second log information includes:
identifying, by the computing system, the respective factor weight for each of the subset of the plurality of second log files.

19. The method of claim 15, wherein the plurality of log generating components are heterogenous hardware and software components.

20. The method of claim 14, wherein the computing system is a Hyper-Converged Infrastructure (HCl) system.

* * * * *